(12) United States Patent
McGowan

(10) Patent No.: US 8,165,343 B1
(45) Date of Patent: Apr. 24, 2012

(54) FORENSIC WATERMARKING

(75) Inventor: Albert John McGowan, Phoenix, AZ (US)

(73) Assignee: Unicorn Media, Inc., Tempe, AZ (US)

(*) Notice: Subject to any disclaimer, the term of this patent is extended or adjusted under 35 U.S.C. 154(b) by 0 days.

(21) Appl. No.: 13/247,109

(22) Filed: Sep. 28, 2011

(51) Int. Cl.
*H04K 1/00* (2006.01)

(52) U.S. Cl. .......... 382/100; 348/461; 726/26

(58) Field of Classification Search ........ 382/100; 726/26; 725/20; 380/201, 202; 348/461
See application file for complete search history.

(56) References Cited

U.S. PATENT DOCUMENTS

| | | | |
|---|---|---|---|
| 5,612,742 A | 3/1997 | Krause et al. | 348/385 |
| 6,505,169 B1 | 1/2003 | Bhagavath et al. | 705/14 |
| 6,912,315 B1* | 6/2005 | Wong et al. | 382/232 |
| 7,788,581 B1 | 8/2010 | Bauermeister | 715/244 |
| 7,827,298 B2 | 11/2010 | Black et al. | 709/231 |
| 7,877,511 B1 | 1/2011 | Berger et al. | 709/242 |
| 7,992,165 B1 | 8/2011 | Ludewig et al. | 725/32 |
| 2002/0046404 A1* | 4/2002 | Mizutani | 725/58 |
| 2002/0122430 A1 | 9/2002 | Haberman et al. | 370/429 |
| 2002/0150239 A1* | 10/2002 | Carny et al. | 380/37 |
| 2003/0229900 A1 | 12/2003 | Reisman | 725/87 |
| 2004/0022391 A1 | 2/2004 | O'Brien | 380/281 |
| 2005/0193205 A1* | 9/2005 | Jacobs et al. | 713/176 |
| 2006/0015637 A1 | 1/2006 | Chung | 709/232 |
| 2006/0114985 A1 | 6/2006 | Linzer | 375/240 |
| 2006/0122882 A1 | 6/2006 | Brown et al. | 705/14 |
| 2006/0288112 A1 | 12/2006 | Soelberg et al. | 709/231 |
| 2007/0162571 A1 | 7/2007 | Gupta et al. | 709/219 |
| 2007/0168542 A1 | 7/2007 | Gupta et al. | 709/231 |
| 2007/0198416 A1 | 8/2007 | Ye | 705/51 |
| 2007/0233891 A1 | 10/2007 | Luby et al. | 709/231 |
| 2008/0005349 A1 | 1/2008 | Li et al. | 709/231 |
| 2008/0141027 A1 | 6/2008 | Kim et al. | 713/156 |
| 2008/0207182 A1 | 8/2008 | Maharajh et al. | 455/414.1 |
| 2009/0022172 A1 | 1/2009 | Haberman et al. | 370/429 |
| 2009/0031424 A1 | 1/2009 | Ganesan et al. | 726/26 |
| 2009/0172197 A1 | 7/2009 | Kalaboukis et al. | 709/246 |
| 2009/0217316 A1 | 8/2009 | Gupta | 725/32 |
| 2009/0257435 A1 | 10/2009 | Karlsson et al. | 370/394 |
| 2009/0287841 A1 | 11/2009 | Chapweske et al. | 709/231 |

(Continued)

FOREIGN PATENT DOCUMENTS

CN 101282478 A 8/2008

(Continued)

OTHER PUBLICATIONS

Australian Patent Office, Examiner's First Report on Patent Application No. 2010202740 for Unicorn Media, Inc., dated Aug. 10, 2010, 3 pages.

(Continued)

*Primary Examiner* — Andrew W Johns
(74) *Attorney, Agent, or Firm* — Kilpatrick Townsend & Stockton LLP

(57) ABSTRACT

Techniques are disclosed for watermarking a video file by watermarking a requested chunk of the video file, which can be done in real time after the request is made for the chunk, during playback of the video file. These techniques can include determining a unique identifier based on unique information of the request and encoding the unique identifier in the requested chunk before sending the requested chunk. Some embodiments can include joining the watermarked chunk with other chunks to reproduce the video file, and sending the reproduced video file having the watermarked chunk included therein.

20 Claims, 5 Drawing Sheets

U.S. PATENT DOCUMENTS

| | | | |
|---|---|---|---|
| 2009/0327896 A1 | 12/2009 | Pall et al. | 715/730 |
| 2010/0057926 A1 | 3/2010 | Cao et al. | 709/231 |
| 2010/0095121 A1 | 4/2010 | Shetty et al. | 713/170 |
| 2010/0100742 A1* | 4/2010 | Courington et al. | 713/176 |
| 2010/0118973 A1 | 5/2010 | Rodriguez et al. | 375/240.25 |
| 2010/0129057 A1 | 5/2010 | Kulkarni | 386/95 |
| 2010/0138892 A1 | 6/2010 | Meuninck et al. | 725/148 |
| 2010/0161425 A1 | 6/2010 | Sideman | 705/14.66 |
| 2011/0029999 A1 | 2/2011 | Foti | 725/25 |
| 2011/0246659 A1 | 10/2011 | Bouazizi | 709/231 |
| 2011/0287748 A1 | 11/2011 | Angel et al. | 455/414.1 |

FOREIGN PATENT DOCUMENTS

| | | |
|---|---|---|
| GB | 2462732 B | 11/2010 |
| WO | WO 2010/025686 A1 | 3/2010 |

OTHER PUBLICATIONS

Australian Patent Office, Examiners First Report on Patent Application No. 2010202741 for Unicorn Media, Inc., dated Aug. 9, 2010, 4 pages.

Ben Atallah, S., et al., "Dynamic Configuration of Multimedia Applications," IFIP International Federation for Information Processing, 2003, 18 pages.

* cited by examiner

FORENSIC WATERMARKING

BACKGROUND OF THE INVENTION

The delivery of media over networks such as the Internet can be accomplished in many ways, including progressive downloading or streaming. Streaming is often preferred to progressive downloading because it offers additional features such as content protection and the ability to seek to undownloaded parts of a video file. The process of preparing a video file for streaming typically involves "chunking" the file, or dividing video files up into smaller segments for delivery. Information including where chunks may be accessed can be stored in an index file, or manifest. This index file can be delivered to a client, such as a media player application, for use in streaming.

The processes of chunking and indexing video files for streaming can present challenges to a media file delivery service provider or content provider in the distribution of the video files. For example, a significant amount of preprocessing is required to prepare media for streaming. These time requirements can limit forensically watermarking video files with information regarding the identity of the entity requesting the video.

BRIEF SUMMARY OF THE INVENTION

Techniques are disclosed for watermarking a video file by watermarking a requested chunk of the video file, which can be done in real time after the request is made for the chunk, during playback of the video file. These techniques can include determining a unique identifier based on unique information of the request and encoding the unique identifier in the requested chunk before sending the requested chunk. Some embodiments can include joining the watermarked chunk with other chunks to reproduce the video file, and sending the reproduced video file having the watermarked chunk included therein.

An example method for encoding a segment of a video file with a unique identifier, according to the disclosure, includes receiving, via a data network, a request for the segment of the video file. The segment of the video file includes video data. The method also includes determining, using a computer processor, the unique identifier. The unique identifier is based on unique information included in the request. The method further includes retrieving the requested segment of the video file from data storage, encoding at least a portion of the video data of the requested segment with the unique identifier, and sending, via the data network, the requested segment of the video file having the video data encoded with the unique identifier.

The example method for encoding a segment of a video file with a unique identifier can include one or more of the following features. The unique identifier comprises a forensic watermark. The segment of the video file comprises a chunk used in streaming the video file. The request for the segment of the video file is received from a media client during playback of the video file. The unique information included in the request includes at least one of a session ID, or a user ID. The unique identifier further includes data indicative of at least one of a globally-unique identifier (GUID), a source of the video file, an entity related to the video file, a location associated with a media client that generated the request, a time of day, a network type, a device type, a date, an Internet Protocol (IP) address, or a Media Access Control (MAC) address. Choosing the request from a plurality of requests, where each of the plurality of requests is made by a media client for a different segment of the video file. Choosing the request is based on a random number. Joining the segment with one or more additional segments to reproduce the video file, where sending the requested segment comprises sending the reproduced video file.

An example server for encoding identification information into a requested segment of a video file, according to the disclosure, includes a network interface a memory configured to store one or more segments of the video file, and a processor communicatively coupled with the memory and the network interface and configured to cause the server to receive, using the network interface, a request for one of the one or more segments of the video file. The requested segment of the video file includes video data. The processor is also configured to determine a unique identifier. The unique identifier is based on unique information of the request. The processor is further configured to retrieve the requested segment of the video file from the memory, encode at least a portion of the video data of the requested segment with the unique identifier, and send, using the network interface, the requested segment of the video file having the video data encoded with the unique identifier.

The example server for encoding the identification information into the requested segment of the video file can include one or more of the following features. The processor is configured to cause the server to send the requested segment of the video file during playback of the video file by a media client communicatively connected with the server. The processor is configured to cause the server to determine the unique identifier on at least one of a session ID, or a user ID. The processor is configured to cause the server to include, in the unique identifier, data indicative of at least one of a globally-unique identifier (GUID), a source of the video file, an entity related to the video file, a location associated with a media client that generated the request, a time of day, a network type, a device type, a date, an Internet Protocol (IP) address, or a Media Access Control (MAC) address. The processor is configured to cause the server to choose the request from a plurality of requests, where each of the plurality of requests is made by a media client for a different segment of the video file and received by the server. The processor is configured to choose the request is based on a random number. The processor is configured to cause the server to join the requested segment with one or more additional segments to reproduce the video file, and send the requested segment in the reproduced video file.

An example non-volatile computer-readable storage medium according to the description, can have instructions embedded thereon for encoding identification information into a requested segment of a video file. The instructions, when executed by a processor, cause the processor to receive a request for the segment of the video file. The requested segment of the video file includes video data. The instructions also cause the processor to determine the unique identifier. The unique identifier is based on unique information included in the request. The instructions further cause the processor to retrieve the requested segment of the video file, encode at least a portion of the video data of the requested segment with the unique identifier, and send the requested segment of the video file having the video data encoded with the unique identifier.

The example non-volatile computer-readable storage medium having the instructions embedded thereon for encoding the identification information into the requested segment of the video file can include one or more of the following features. The request is received from a media client during playback of the video file. Instructions that, when executed by the processor, cause the processor to choose the request from a plurality of requests, where each of the plurality of requests is made by a media client for a different segment of the video file. Instructions that, when executed by the processor, cause the processor to join the requested segment with one or more additional segments to reproduce the video file, wherein sending the requested segment comprises sending the reproduced video file.

BRIEF DESCRIPTION OF THE DRAWINGS

The present disclosure is described in conjunction with the appended figures.

Figure 1:
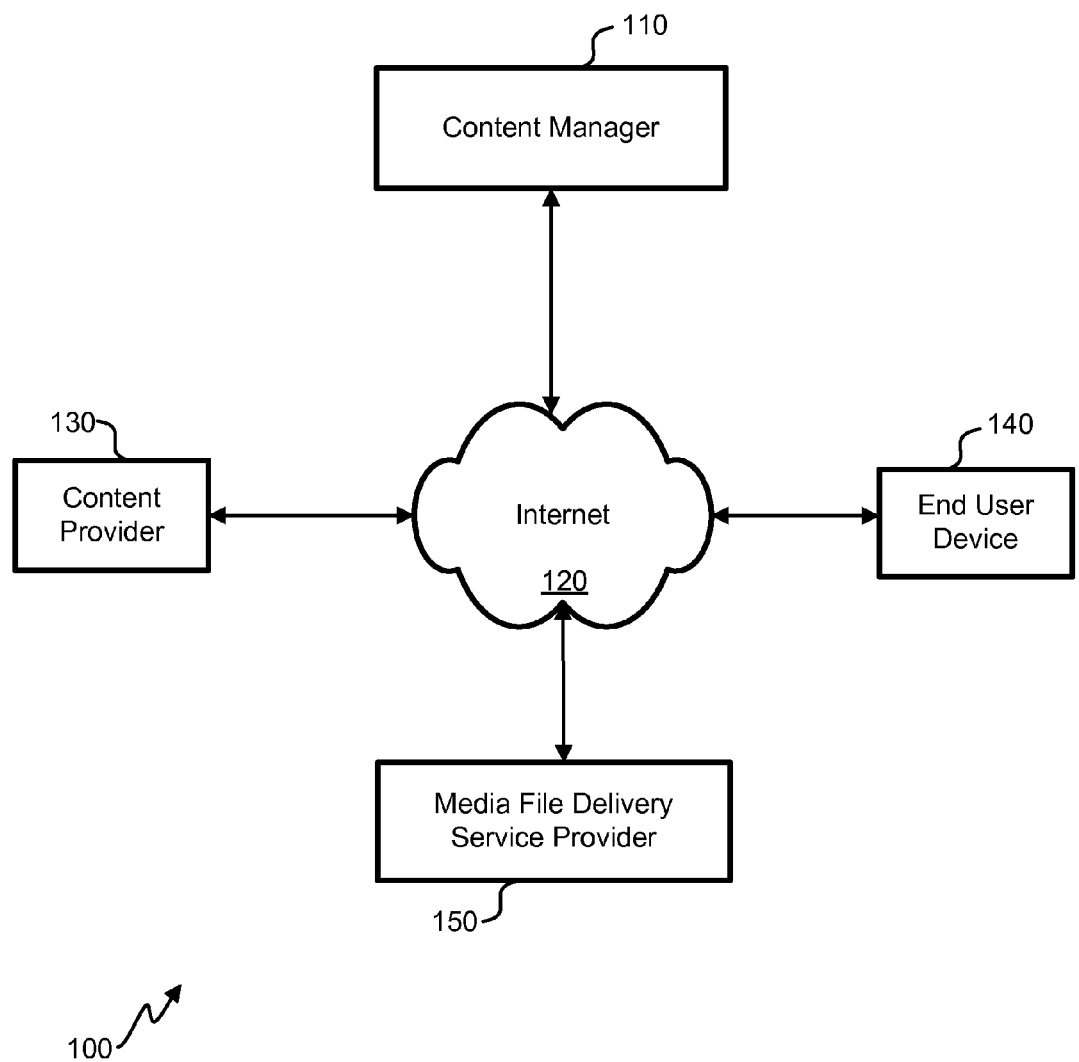
FIG. 1 is a block diagram illustrating a video servicing system 100, according an embodiment of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred embodiment(s) only, and is not intended to limit the scope, applicability or configuration of the disclosure. Rather, the ensuing description of the preferred embodiment(s) will provide those skilled in the art with an enabling description for implementing a preferred embodiment. It is understood that various changes may be made in the function and arrangement of elements without departing from the spirit and scope as set forth in the appended claims.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. Media streaming has become a widely-used method of media distribution, but the preprocessing associated with streaming can be burdensome. Certain protocols, including forms of Hypertext Transfer Protocol (HTTP) streaming, require chunking the video files (i.e., splitting video files into multiple smaller segments, known as "chunks"), storing the chunked video files, and generating a corresponding index file(s) (also known as a "manifest" file). In a traditional approach, this can involve a large amount of preprocessing. Furthermore, preprocessing can include encoding video files into a variety of different formats. Thus, preprocessing video files in this manner can take a large amount of time, processing power, and storage space.

Preprocessing can also include forensic watermarking the video files. A forensic watermark can include any of a variety of identifying information inserted into the video file for later identification. Unlike other forms of digital watermarking, forensic watermarking can be inserted into the video stream of a video file and unnoticeable to a user during playback of the video. Because the information included in the forensic watermark can be very small in comparison with the rest of video data, the forensic watermark can have little if any effect on the playback of the video file. In fact, the forensic watermark can be seen by a media client simply as data corruption or other "noise" in the video data, which many media clients are designed to tolerate.

The identifying information included in a forensic watermark can be used to identify a particular instance of a video file. This information can help a media provider to determine a source of a video file obtained later, which, among other things, can be beneficial in preventing undesired or illegal distribution of the video file. For example, a media provider may use the identifying information in a forensic watermark of an illegally-distributed video file to identify a particular entity to whom the video file was first provided. The media provider can then approach the particular entity to prevent further distribution of the video file.

Because a forensic watermark is typically encoded in a video file during preprocessing, there are limitations in the identification information that the forensic watermarks can include. For example, forensic watermarking performed before a file is requested cannot include specific information about the request, such as a session ID and/or user ID that can be useful in subsequent identification of the particular instance of the video file. Moreover, a different instance of the video file would need to be preprocessed and stored for every different forensic watermark to be used in the distribution of that video file. On the other hand, if the digital watermarking is performed after the request, the requirements of preprocessing the file can substantially delay delivery of the digitally-watermarked file.

New techniques have been developed, however, to eliminate much of the preprocessing required in the distribution of video files on the Internet. For example, because video files are frequently stored in a format that requires little additional processing to chunk, the chunks can be created in real time, during the streaming of a video file. The systems and methods disclosed in U.S. patent application Ser. No. 12/976,883, entitled "DYNAMIC CHUNKING FOR MEDIA STREAMING," and U.S. patent application Ser. No. 12/976,890, entitled "DYNAMIC INDEXING FOR AD INSERTION IN MEDIA STREAMING," which are incorporated herein by reference, take advantage of these features to enable dynamic index file creation and dynamic video file chunking.

As explained in more detail below, techniques also can be adapted to provide forensic watermarking of video files separate from other preprocessing. This enables watermarking to occur in real time, during playback of the video files. This also can enable the systems to include watermarks with detailed identification information. Such forensic watermarking can be utilized in a variety of systems, including those that preprocess and store chunks of a video file, as well as those that can dynamically create the chunks when requested. Moreover, techniques described herein are not limited to forensic watermarking chunks of a video file, but also can be utilized to forensically watermark whole files as well as non-video files and/or chunks of non-video files. Furthermore, the techniques described herein may also return a video file that has been dynamically stitched together from many chunks, which, to a client, can appear like a contagious file for continuous streaming protocols (Real Time Messaging Protocol (RTMP), Real Time Streaming Protocol (RTSP), etc.) as well as for progressive download.

While the forensic watermarking provided herein may be implemented in a variety of different systems, some particular embodiments may be implemented as part of a video servicing system. FIG. 1 is a block diagram illustrating a video servicing system 100, according to some embodiments of the present invention. The video servicing system 100 may deliver video content to the end user device 140 through a network data such as the Internet 120. The end user device 140 can be one of any number of devices configured to receive media over the Internet 120, such as a mobile phone, tablet computer, personal computer, portable media device, etc. A video file provided by a content provider 130 can be processed and/or indexed by content manager 110, and further stored on media file delivery service provider (MFDSP) 150. Additionally or alternatively, the content manager 110 may also be adapted to store the video file. Moreover, the content manager 110 may comprise a distributed system with multiple networked servers.

The video servicing system 100 further enables a content provider 130 or other entity to gather information regarding user behavior during media playback. For example, a content provider 130 can be provided with data indicating that end users tend to stop watching a video at a certain point in playback, or that users tended to follow links associated with certain advertisements displayed during playback. With this data, a content provider 130 can adjust factors such as media content, advertisement placement and content, etc., to increase revenue associated with the media content and provide the end user device 140 with a more desirable playback experience.

End user device 140 can request a video file to stream and/or download with a media client executed by the end user device 140. The media client can be, for example, a media player, browser, or other application adapted to request and/or play video files. In response to a request for a video file, the content manager 110 can provide the media client information concerning the requested video file. The information can include where the video file can be located, such as within the MFDSP 150 or within the content manager 110 itself. Location information may be provided by a uniform resource locator (URL) or other indicator. Where an index file is used for streaming a video file, the media client can stream the requested video file by using successive URLs designated in the index file to download chunks from the MFDSP 150 (or other source). During playback of the video file, the content manager 110 also can collect data regarding the playback and provide the data and/or any analytics information derived from the data to the content provider 130.

Figure 2:
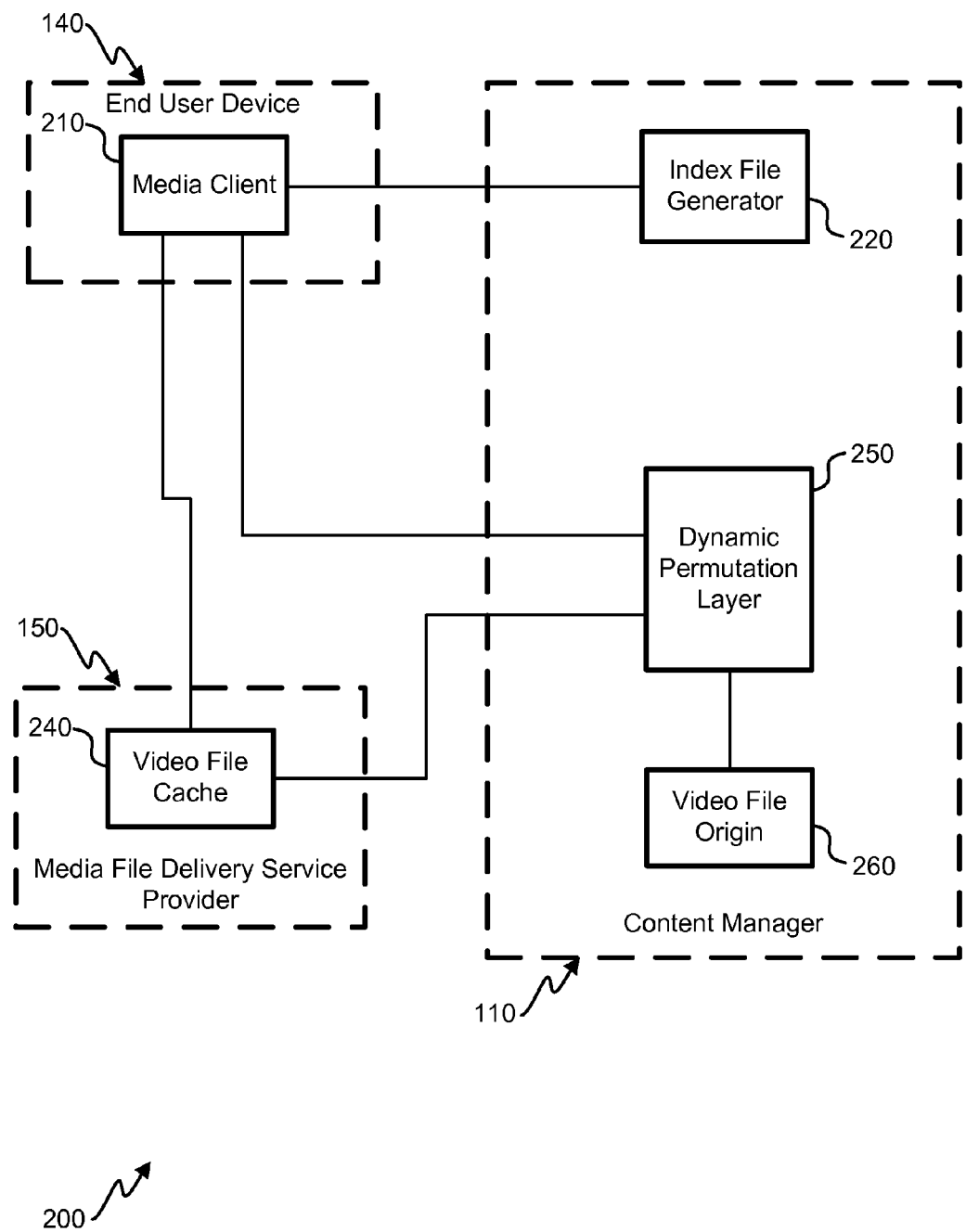
FIG. 2 is a block diagram of an embodiment of a system for watermarking and delivering video files.

FIG. 2, shows a more detailed view of an embodiment of a system 200 for watermarking and delivering video files. The system 200 is provided as an example only and is not limiting. Components of the system 200 can comprise hardware and/or software and can be combined, separated, or otherwise divided to provide the functionality described herein.

In this system 200, chunks of media can be generated during media streaming by a dynamic permutation layer (DPL) 250 providing an HTTP service. The DPL 250, as well as the video file origin 260 can be software and/or hardware components of a content manager 110 that can be located on and/or distributed among one or more physical servers. The system 200 can be configured such that the DPL 250 provides dynamically-created chunks of media to a MFDSP 150 for delivery to media client 210. The MFDSP 150 can store the chunks locally in, for example, a video file cache 240, thereby forgoing the need to dynamically create a chunk again if the same chunk is requested in the future. A person of ordinary skill in the art will recognize various modifications, alterations, and variations.

The system 200 can include a media client 210, which, as mentioned above, can be media player, a plug-in, a browser, or other software application configured to play video files and executed by an end user device 140. The end user device 140 can be a cell phone, smart phone, notebook computer, personal computer, tablet, media player, television, or other electronic device with hardware and/or software capable of executing the media client 210. The media client is communicatively connected with the MFDSP 150 and content manager 110 through a data network, such as the Internet 120, through which video information is communicated.

An index file (i.e. manifest file) generator 220 can be a program instantiated for media streaming to a particular media client 210. The index file generator 220 can be executed on a server or other computing device within the content manager 110. Index files generated by the index file generator can include a wide variety of information such as starting, ending, and or run times for media chunks and locations for media chunks. This information can be embedded in a single string of data, such as a URL or other type of uniform resource identifier (URI). If media includes various sub-streams (e.g., streams with alternative bitrates, captions, alternative languages, etc.) the index file can include data for video files or chunks corresponding to each of the alternative sub-streams, as well as information regarding the bitrate and/or other unique information for each stream. The index file(s) utilized to access chunks of a video file (or whole files, in some embodiments) can vary in content and format, depending on protocols utilized by a media player application configured to play the streamed and/or downloaded video file. In alternative embodiments, the index file generator 220 can be replaced with a redirector that simply redirects the media client to the location of a chunk, rather than provides an index file to the media client 210. A person of skill in the art will recognize various alterations, modifications, and substitutions.

The index file generator 220 also can determine which chunk(s) of a video file to forensically watermark. In some embodiments, the index file generator 220 can, upon receiving a request corresponding to a particular video file, determine which chunk(s) of the particular video file to watermark. In other words, the media client 210 can make multiple requests to the index file generator 220 where each request is for a different chunk of a video file, and the index file generator 220 can choose which of the requests will receive a watermarked chunk in response.

To help ensure the forensic watermark is less detectable to entities that may want to subsequently remove the watermark, the determination of which chunk(s) of a video file will be watermarked can be randomized. For example, an index file generator can use an algorithm that incorporates a random number so that, for a particular video file, a first media client may receive video with a forensic watermark encoded in the first chunk, and a second media client may receive video with a forensic watermark encoded in the fifth chunk, and so on.

Although the index file generator 220 may direct the media client 210 where to obtain chunks (or whole files, as the case may be), they are actually provided to the media client 210 by other components of the system 200. For video chunks that are not watermarked, the media client can be directed to the MFDSP 150, that can store the chunks in a video file cache 240. If the requested chunk is not in the video file cache 240, the MFDSP 150 can obtain contact a dynamic permutation layer (DPL) 250 that can provide the requested chunk to the MFDSP 150 by retrieving the video file stored in a video file origin 260 and creating the requested chunk dynamically. The MFDSP 150 can the cache the chunk and provide it to the media client 210. In alternative embodiments, the DPL 250 may not dynamically create the requested chunk, but simply provide a preprocessed chunk stored in the video file origin 260, or the MFDSP 150 can have direct access to the requested chunk stored in the video file origin 260.

Dynamic generation of chunks and/or entire video files may or may not involve transcoding. The video file can be stored in a format where transcoding may not be needed, thereby reducing the processing requirements for creating chunks of media during streaming and/or downloading. For example, video files may be stored such as H.264 or MPEG-4 video format and/or AAC, HE-AAC, or MP3 audio format. According to some streaming protocols, such as some forms of HTTP streaming, chunks of media in these formats would not need transcoding before being wrapped in an MPEG-2 transport stream container format. Instead, such a conversion essentially would require the addition of metadata to create the streaming format from the format of the stored video file. In other words, generating a deliverable chunk of media may only require identifying the stored video file, extracting the relevant segment of the media from the video file, and adding certain metadata in accordance with a container format. This process requires little processing power and can be easily performed on the fly during streaming. More details regarding this process can be found in U.S. patent application Ser. No. 13/092,299, entitled "TRANSCODELESS ON-THE-FLY AD INSERTION," which is incorporated by reference herein in its entirety. Once the deliverable chunk of media is generated, it can be forensically watermarked according to the techniques described herein.

If a chunk is chosen to be watermarked, the index file generator 220 can include a URL in the index file, corresponding to the requested chunk, that directs the media client 210 to the DPL 250. When the media client 210 makes a request for the chunk to the DPL 250, in addition to the URL and a flag or other indicator that the requested chunk is to be watermarked, the request can include information regarding the identification of the media client 210. This information can include a session ID and/or user ID, for example, that can be located in a request header. After receiving the request from the media client 210, the DPL 250 can create the forensic watermark (or other unique identifier) to insert into the video data of the requested chunk based on information from the request, before sending the requested chunk (having the forensic watermark) to the media client 210.

In sum, the system 200 for forensically watermarking of a video file can include an index file generator 220 that receives a request for an index file from a media client 210 and dynamically generates an index file. The index file can, among other things, indicate where a next chunk of a video file may be located. The media client 210 can then request the chunk from the location indicated by the index file, which can comprise a video file cache 240 in a MFDSP 150. If the chunk is to be watermarked, the media client 210 is directed to the DPL 250, which can dynamically watermark the requested chunk by accessing the corresponding video file in the video file origin 260. The DPL 250 determines a forensic watermark key (e.g., by generating a unique identifier based on identifying information in the request from the media client) and create a forensically-watermarked chunk by encoding at least a portion of the video data of the requested chunk with the forensic watermark. The forensically-watermarked chunk then can be provided to the media client 210. In alternative embodiments where the media client 210 is configured to download a complete file, the forensically-watermarked chunk may be joined with other chunks to reproduce the video file, and the reproduced video file is provided to the media client 210 for download.

Figure 3:
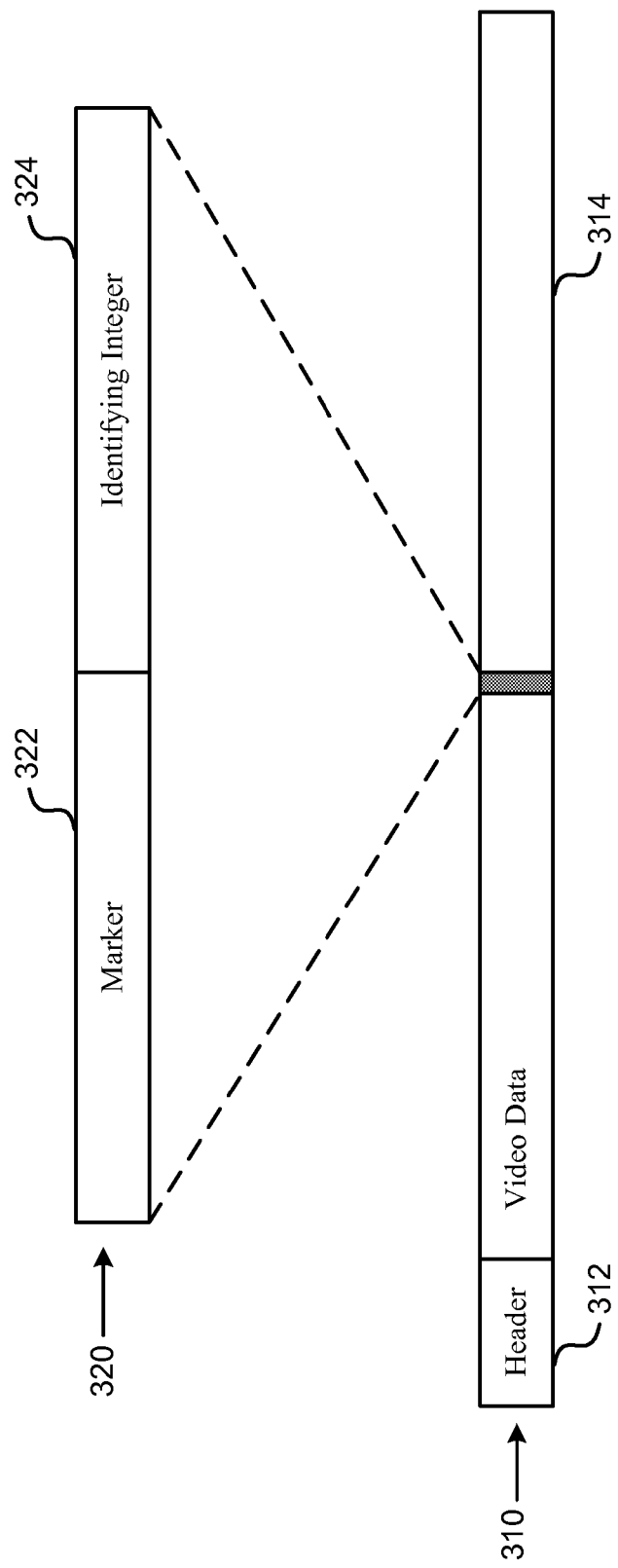
FIG. 3 is a simplified representation of a forensic watermark inserted into the video data of a chunk, according to one embodiment of the present invention.

Referring to FIG. 3, a simplified representation of a forensic watermark 320 inserted into the video data 314 of a chunk 310 is shown. In this embodiment, the forensic watermark 320 includes a marker 322 followed by an identifying integer 324. The marker 322 can be an identifiable sequence of data that can be used as a flag to indicate the location of the forensic watermark 320 in the video file. It can be designed to be relatively difficult to find by comparing video files (rather than, for example, a series of all 1s or all 0s). Additionally or alternatively, the marker 322 can include information, such as the identity of a source of the video file. In an embodiment, for example, all video files from a particular source can have the same marker 322.

Immediately following the marker 322 is the identifying integer 324. The identifying integer can include a variety of data that can uniquely identify an instance of the video file. For example, the DPL 250 can use the identifying information from the request of the media client 210 to create an identifying integer 324 that represents the identifying information, as well as any other information that could be helpful in identifying the instance of the video file and/or the entity requesting it. Such information can include a globally-unique identifier (GUID), a source or other entity related to the video file, a location associated with the media client that generated the request (e.g., latitude, longitude, etc.), a time of day, a date, a device type associated with the media client 210, a network type associated with the media client, an internet protocol (IP) address, a media access control (MAC) address, and the like. In alternative embodiments, the identifying integer 324 can be located at other locations relative to the marker 322, such as immediately before the marker 322 or at some other location as indicated by the marker 322.

The size of the forensic watermark 320 can vary, depending on desired functionality. In some embodiments, for example, the forensic watermark 320 comprise a 384-bit sequence comprising a 192-bit marker 322 followed by a 192-bit identifying integer. In other embodiments, the forensic watermark 320 can be 256 bits, 128 bits, or 64 bits. Other embodiments contemplate forensic watermarks 320 larger than 256 bits or smaller than 64 bits. Additionally or alternatively, the size of each component 322 and 324 of the forensic watermark 320 can vary. For example, in one embodiment, the marker may comprise a 64-bit integer and the identifying integer may comprise a 192-bit integer. In other embodiments, components 322 and 324 can comprise data types other than integers.

Generally speaking, an upper limit to the size of the forensic watermark 320 is the threshold of tolerance allowable by media clients 210, below which the media clients 210 can playback a video file without noticeable errors. With this in mind, the forensic watermark 320 can be inserted into the video data 314 (e.g., video stream) of a chunk 310, which typically has higher tolerance for data corruption than other portions of the chunk, such as the header 312. Furthermore, depending on the protocol, some chunks may contain control information, rather than video data, which also has a relatively low threshold of tolerance for data corruption. Thus, many embodiments include inserting the forensic watermark 320 into video data 314.

Figure 4:
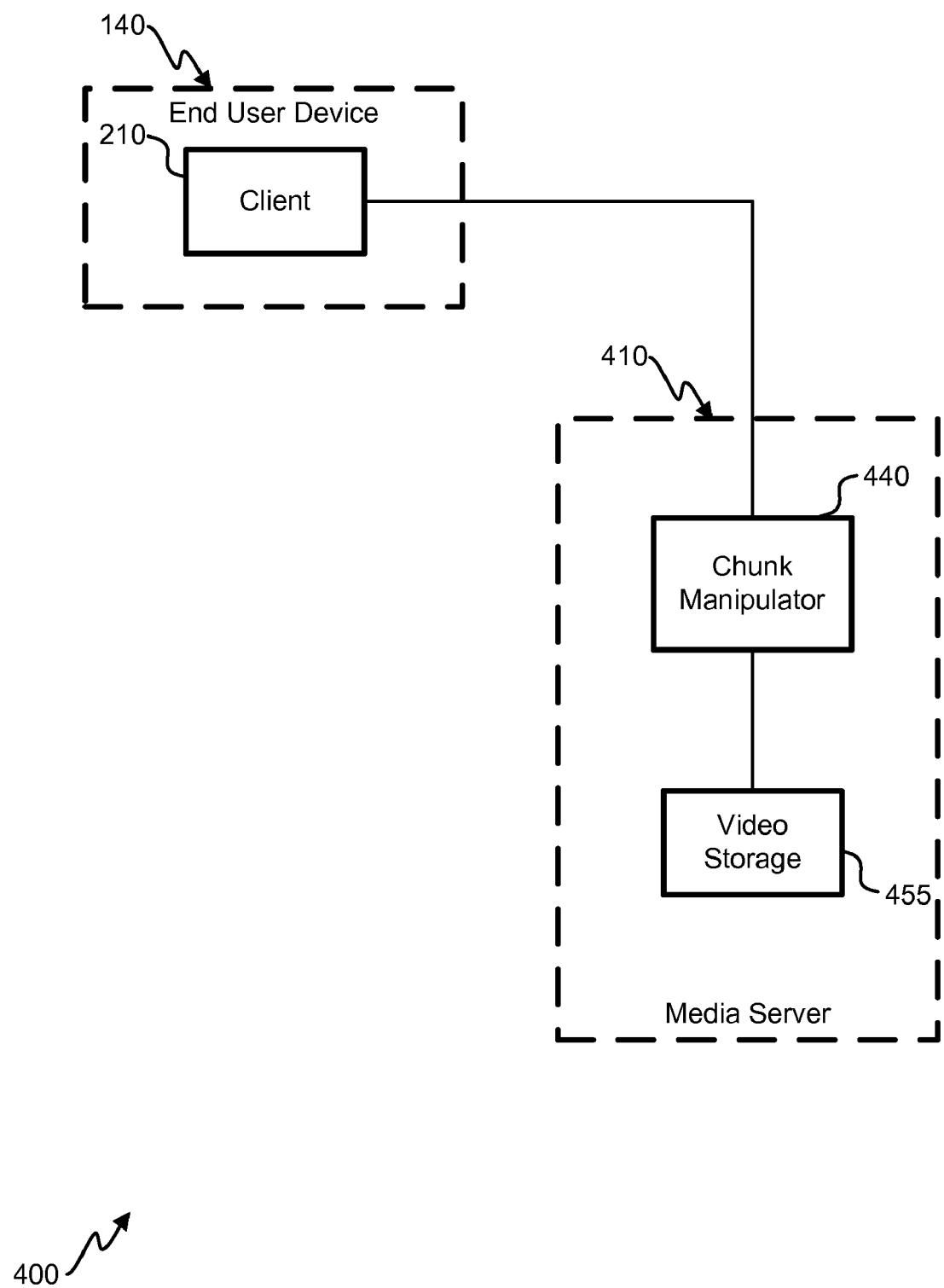
FIG. 4 is a simplified illustration of an embodiment of a system for forensic watermarking integrated into a traditional system that may not have dynamic chunking and/or dynamic indexing capabilities.

FIG. 4 is a simplified illustration of an embodiment of a system 400 for forensic watermarking integrated into a traditional system that may not have dynamic chunking and/or dynamic indexing capabilities. Here, an index file for streaming a video file can include a URL that directs a media client 210 to a media server 410 that essentially performs the functions of the MFDSP 150 and content manager 110 of FIG. 2. The media server 410 can include a chunk manipulator 440 communicatively connected with a video storage 455 that stores media chunks and/or video file(s). After receiving a request for a chunk from the media client 210, the chunk manipulator 440 determine whether to forensically watermark the requested chunk and, if so, determine a forensic watermark based on unique information provided in the request (e.g., session ID and/or user ID). The chunk manipulator 440 then can create an forensically-watermarked media chunk by encoding at least a portion of the video data of the requested media chunk with the forensic watermark, and provide the encrypted media chunk to the client. As with other embodiments provided herein, this system 400 can be modified to provide watermarking for complete video files in addition to chunks.

The embodiment 400 shown in FIG. 8 is provided as an example and is not limiting. As with other illustrations provided herein, the embodiment 800 can be altered in numerous ways without departing from the spirit and scope of this disclosure. For example, the media chunks may be stored at a location and/or system remote from the media server 410. Moreover, functionality can be distributed and/or shared among multiple components (e.g., multiple chunk manipulators 440 and/or video storage 455). Other such variations are contemplated.

Figure 5:
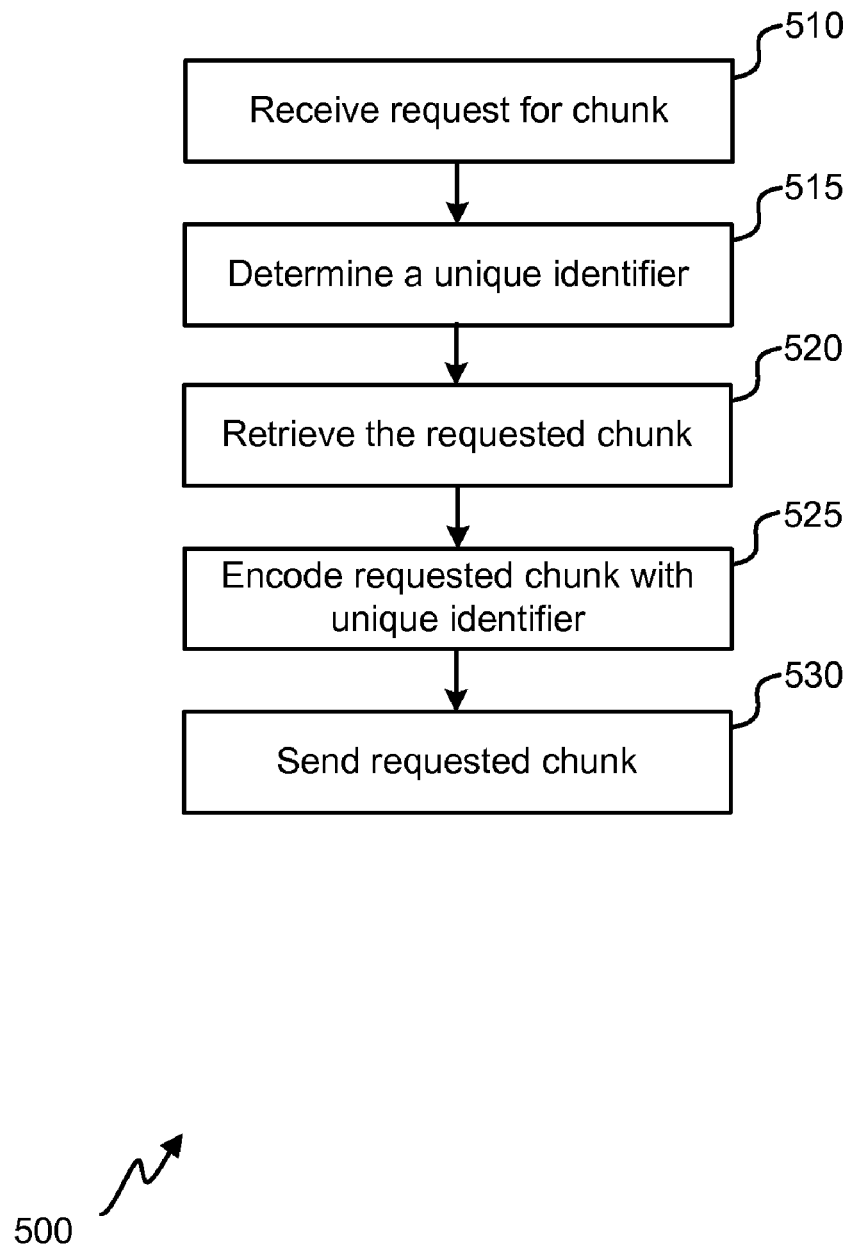
FIG. 5 is a simplified flowchart of a method for encoding a segment of a video file with a unique identifier, according to one embodiment of the present invention.

FIG. 5 is a simplified flowchart of a method 500 for encoding a segment of a video file with a unique identifier, which can be executed, for example, by the DPL 250 or chunk manipulator 440. The method 500 begins at block 510 where a request for a chunk of a video file is received. As indicated earlier, such a request can come from a media client 210 running on an end user device 140.

At block 515 a unique identifier is determined. The unique identifier can comprise a forensic watermark 320 that includes identification information based on the received request. The identification information can be located in an identifying integer 324 of the forensic watermark 320, and the forensic watermark 320 additionally can include a marker 322 to facilitate the subsequent locating of the forensic watermark 320 in the video file.

At block 520 the requested chunk is retrieved, and at block 525, the requested chunk is encoded with the unique identifier. As indicated previously, encoding the chunk can comprise inserting and/or replacing video data of the requested chunk with the unique identifier. Finally, at block 530, the requested chunk is sent to the requesting entity, such as the media client 210.

It should be appreciated that the specific blocks illustrated in FIG. 5 provide a particular method of encoding the segment of a video file with a unique identifier according to an embodiment of the present invention. Other sequences of blocks may also be performed according to alternative embodiments. For example, alternative embodiments of the present invention may perform the functions outlined above in a different order. Moreover, the individual blocks illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a non-volatile computer-readable storage medium, such as CD-ROMs or other type of optical disks, ROMs, RAMs, EPROMs, EEPROMs, magnetic or optical cards, flash memory, or other types of machine-readable mediums suitable for storing electronic instructions. Embodiments describing computer storage (e.g., chunk storage) also can include such storage media. One or more processors may perform the necessary tasks. Additionally, communication between components of the embodiments herein, as well as communication of components of the embodiments described herein with external devices, can be performed with a communication interface, such as a network interface.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for encoding a segment of a video file with a unique identifier, the method comprising:
   receiving, via a data network, a request for the segment of the video file, wherein the segment of the video file includes video data and comprises one of a plurality of separately-addressable segments of the video file for use by a media player to individually stream each of the plurality of separately-addressable segments of the video file from one or more source files;
   determining, using a computer processor, the unique identifier, wherein the unique identifier is based on unique information included in the request;
   retrieving the requested segment of the video file from data storage;
   encoding at least a portion of the video data of the requested segment with the unique identifier; and
   sending, via the data network, the requested segment of the video file having the video data encoded with the unique identifier.

2. The method for encoding the segment of the video file with the unique identifier as recited in claim 1, wherein the request for the segment of the video file is received from the media player during playback of the video file.

3. The method for encoding the segment of the video file with the unique identifier as recited in claim 1, wherein the unique identifier further includes data indicative of at least one of:
   a globally-unique identifier (GUID),
   a source of the video file,
   an entity related to the video file,
   a location associated with the media player that generated the request,
   a time of day,
   a network type,
   a device type,
   a date,
   an Internet Protocol (IP) address, or
   a Media Access Control (MAC) address.

4. The method for encoding the segment of the video file with the unique identifier as recited in claim 1, further comprising choosing the request from a plurality of requests, wherein each of the plurality of requests is made by the media player for a different segment of the video file.

5. A server for encoding identification information into a requested segment of a video file, the server comprising:
   a network interface;
   a memory configured to store one or more segments of the video file; and
   a processor communicatively coupled with the memory and the network interface and configured to cause the server to:
   receive, using the network interface, a request for one of the one or more segments of the video file, wherein the requested segment of the video file includes video data and comprises one of a plurality of separately-addressable segments of the video file for use by a media player to individually stream each of the plurality of separately-addressable segments of the video file from one or more source files;
   determine a unique identifier, wherein the unique identifier is based on unique information of the request;
   retrieve the requested segment of the video file from the memory;
   encode at least a portion of the video data of the requested segment with the unique identifier; and
   send, using the network interface, the requested segment of the video file having the video data encoded with the unique identifier.

6. The server for encoding the identification information into the requested segment of the video file as recited in claim 5, wherein the processor is configured to cause the server to send the requested segment of the video file during playback of the video file by the media player communicatively connected with the server.

7. The server for encoding the identification information into the requested segment of the video file as recited in claim 5, wherein the processor is configured to cause the server to include, in the unique identifier, data indicative of at least one of:
   a globally-unique identifier (GUID),
   a source of the video file,
   an entity related to the video file,
   a location associated with the media player that generated the request,
   a time of day,
   a network type,
   a device type,
   a date,
   an Internet Protocol (IP) address, or
   a Media Access Control (MAC) address.

8. The server for encoding the identification information into the requested segment of the video file as recited in claim 5, wherein the processor is configured to cause the server to choose the request from a plurality of requests, wherein each of the plurality of requests is made by the media player for a different segment of the video file and received by the server.

9. A non-volatile computer-readable storage medium having instructions embedded thereon for encoding identification information into a requested segment of a video file, the instructions, when executed by a processor, cause the processor to:
   receive a request for the segment of the video file, wherein the requested segment of the video file includes video data and comprises one of a plurality of separately-addressable segments of the video file for use by a media player to individually stream each of the plurality of separately-addressable segments of the video file from one or more source files;
   determine the unique identifier, wherein the unique identifier is based on unique information included in the request;
   retrieve the requested segment of the video file;
   encode at least a portion of the video data of the requested segment with the unique identifier; and
   send the requested segment of the video file having the video data encoded with the unique identifier.

10. The non-volatile computer-readable storage medium having the instructions embedded thereon for encoding the identification information into the requested segment of the video file as recited in claim 9, wherein the request is received from the media player during playback of the video file.

11. The non-volatile computer-readable storage medium having the instructions embedded thereon for encoding the identification information into the requested segment of the video file as recited in claim 9, further comprising instructions that, when executed by the processor, cause the processor to choose the request from a plurality of requests, wherein each of the plurality of requests is made by the media player for a different segment of the video file.

12. The server for encoding the identification information into the requested segment of the video file as recited in claim 10, wherein the processor is configured to cause the server to determine the unique identifier on at least one of:
- a session ID, or
- a user ID.

13. The server for encoding the identification information into the requested segment of the video file as recited in claim Error! Reference source not found., wherein the processor is configured to cause the server to include, in the unique identifier, data indicative of at least one of:
- a globally-unique identifier (GUID),
- a source of the video file,
- an entity related to the video file,
- a location associated with the media player that generated the request,
- a time of day,
- a network type,
- a device type,
- a date,
- an Internet Protocol (IP) address, or
- a Media Access Control (MAC) address.

14. The server for encoding the identification information into the requested segment of the video file as recited in claim Error! Reference source not found., wherein the processor is configured to cause the server to choose the request from a plurality of requests, wherein each of the plurality of requests is made by the media player for a different segment of the video file and received by the server.

15. The server for encoding the identification information into the requested segment of the video file as recited in claim 14, wherein the processor is configured to choose the request is based on a random number.

16. The server for encoding the identification information into the requested segment of the video file as recited in claim 10, wherein the processor is configured to:
- cause the server to join the requested segment with one or more additional segments to reproduce the video file; and
- send the requested segment in the reproduced video file.

17. A non-volatile computer-readable storage medium having instructions embedded thereon for encoding identification information into a requested segment of a video file, the instructions, when executed by a processor, cause the processor to:
- receive a request for the segment of the video file, wherein the requested segment of the video file includes video data and comprises one of a plurality of separately-addressable segments of the video file for use by a media player to individually stream each of the plurality of separately-addressable segments of the video file from one or more source files;
- determine the unique identifier, wherein the unique identifier is based on unique information included in the request;
- retrieve the requested segment of the video file;
- encode at least a portion of the video data of the requested segment with the unique identifier; and
- send the requested segment of the video file having the video data encoded with the unique identifier.

18. The non-volatile computer-readable storage medium having the instructions embedded thereon for encoding the identification information into the requested segment of the video file as recited in claim Error! Reference source not found., wherein the request is received from the media player during playback of the video file.

19. The non-volatile computer-readable storage medium having the instructions embedded thereon for encoding the identification information into the requested segment of the video file as recited in claim 17 further comprising instructions that, when executed by the processor, cause the processor to choose the request from a plurality of requests, wherein each of the plurality of requests is made by the media player for a different segment of the video file.

20. The non-volatile computer-readable storage medium having the instructions embedded thereon for encoding the identification information into the requested segment of the video file as recited in claim 17, further comprising instructions that, when executed by the processor, cause the processor to join the requested segment with one or more additional segments to reproduce the video file, wherein sending the requested segment comprises sending the reproduced video file.

* * * * *

UNITED STATES PATENT AND TRADEMARK OFFICE
CERTIFICATE OF CORRECTION

| | | |
|---|---|---|
| PATENT NO. | : 8,165,343 B1 | Page 1 of 4 |
| APPLICATION NO. | : 13/247109 | |
| DATED | : April 24, 2012 | |
| INVENTOR(S) | : Albert John McGowan | |

It is certified that error appears in the above-identified patent and that said Letters Patent is hereby corrected as shown below:

In the Claims:

Cols. 11-14, lines 2-41;

Please delete "Claims 1 through 20" and insert

--1. A method for encoding a segment of a video file with a unique identifier, the method comprising:
receiving, via a data network, a request for the segment of the video file, wherein the segment of the video file includes video data and comprises one of a plurality of separately-addressable segments of the video file for use by a media player to individually stream each of the plurality of separately-addressable segments of the video file from one or more source files;
determining, using a computer processor, the unique identifier, wherein the unique identifier is based on unique information included in the request;
retrieving the requested segment of the video file from data storage;
encoding at least a portion of the video data of the requested segment with the unique identifier; and
sending, via the data network, the requested segment of the video file having the video data encoded with the unique identifier.

2. The method for encoding the segment of the video file with the unique identifier as recited in claim 1, wherein the unique identifier comprises a forensic watermark.

3. The method for encoding the segment of the video file with the unique identifier as recited in claim 1, wherein the segment of the video file comprises a chunk used in streaming the video file.

4. The method for encoding the segment of the video file with the unique identifier as recited in claim 1, wherein the request for the segment of the video file is received from the media player during playback of the video file.

Signed and Sealed this
Seventeenth Day of July, 2012

David J. Kappos
*Director of the United States Patent and Trademark Office*

5. The method for encoding the segment of the video file with the unique identifier as recited in claim 1, wherein the unique information included in the request includes at least one of:

a session ID, or
    a user ID.

6. The method for encoding the segment of the video file with the unique identifier as recited in claim 1, wherein the unique identifier further includes data indicative of at least one of:

a globally-unique identifier (GUID),
    a source of the video file,
    an entity related to the video file,
    a location associated with the media player that generated the request,
    a time of day,
    a network type,
    a device type,
    a date,
    an Internet Protocol (IP) address, or
    a Media Access Control (MAC) address.

7. The method for encoding the segment of the video file with the unique identifier as recited in claim 1, further comprising choosing the request from a plurality of requests, wherein each of the plurality of requests is made by the media player for a different segment of the video file.

8. The method for encoding the segment of the video file with the unique identifier as recited in claim 7, wherein choosing the request is based on a random number.

9. The method for encoding the segment of the video file with the unique identifier as recited in claim 1, further comprising joining the segment with one or more additional segments to reproduce the video file, wherein sending the requested segment comprises sending the reproduced video file.

10. A server for encoding identification information into a requested segment of a video file, the server comprising:
    a network interface;
    a memory configured to store one or more segments of the video file; and
    a processor communicatively coupled with the memory and the network interface and configured to cause the server to:
        receive, using the network interface, a request for one of the one or more segments of the video file, wherein the requested segment of the video file includes video data and comprises one of a plurality of separately-addressable segments of the video file for use by a media player to individually stream each of the plurality of separately-addressable segments of the video file from one or more source files;
        determine a unique identifier, wherein the unique identifier is based on unique information of the request;
        retrieve the requested segment of the video file from the memory;

encode at least a portion of the video data of the requested segment with the unique identifier; and send, using the network interface, the requested segment of the video file having the video data encoded with the unique identifier.

11. The server for encoding the identification information into the requested segment of the video file as recited in claim 10, the processor is configured to cause the server to send the requested segment of the video file during playback of the video file by the media player communicatively connected with the server.

12. The server for encoding the identification information into the requested segment of the video file as recited in claim 10, wherein the processor is configured to cause the server to determine the unique identifier on at least one of:
a session ID, or
a user ID.

13. The server for encoding the identification information into the requested segment of the video file as recited in claim 10, wherein the processor is configured to cause the server to include, in the unique identifier, data indicative of at least one of:
a globally-unique identifier (GUID),
a source of the video file,
an entity related to the video file,
a location associated with the media player that generated the request,
a time of day,
a network type,
a device type,
a date,
an Internet Protocol (IP) address, or
a Media Access Control (MAC) address.

14. The server for encoding the identification information into the requested segment of the video file as recited in claim 10, wherein the processor is configured to cause the server to choose the request from a plurality of requests, wherein each of the plurality of requests is made by the media player for a different segment of the video file and received by the server.

15. The server for encoding the identification information into the requested segment of the video file as recited in claim 14, wherein the processor is configured to choose the request is based on a random number.

16. The server for encoding the identification information into the requested segment of the video file as recited in claim 10, wherein the processor is configured to:
cause the server to join the requested segment with one or more additional segments to reproduce the video file; and
send the requested segment in the reproduced video file.

CERTIFICATE OF CORRECTION (continued)
U.S. Pat. No. 8,165,343 B1

17. A non-volatile computer-readable storage medium having instructions embedded thereon for encoding identification information into a requested segment of a video file, the instructions, when executed by a processor, cause the processor to:

receive a request for the segment of the video file, wherein the requested segment of the video file includes video data and comprises one of a plurality of separately-addressable segments of the video file for use by a media player to individually stream each of the plurality of separately-addressable segments of the video file from one or more source files;

determine the unique identifier, wherein the unique identifier is based on unique information included in the request;

retrieve the requested segment of the video file;

encode at least a portion of the video data of the requested segment with the unique identifier; and send the requested segment of the video file having the video data encoded with the unique identifier.

18. The non-volatile computer-readable storage medium having the instructions embedded thereon for encoding the identification information into the requested segment of the video file as recited in claim 17, wherein the request is received from the media player during playback of the video file.

19. The non-volatile computer-readable storage medium having the instructions embedded thereon for encoding the identification information into the requested segment of the video file as recited in claim 17, further comprising instructions that, when executed by the processor, cause the processor to choose the request from a plurality of requests, wherein each of the plurality of requests is made by the media player for a different segment of the video file.

20. The non-volatile computer-readable storage medium having the instructions embedded thereon for encoding the identification information into the requested segment of the video file as recited in claim 17, further comprising instructions that, when executed by the processor, cause the processor to join the requested segment with one or more additional segments to reproduce the video file, wherein sending the requested segment comprises sending the reproduced video file.--